Sept. 1, 1925.
C. FORTWENGLER
1,552,130
NONGLARE WINDSHIELD DEVICE
Filed Dec. 8, 1923
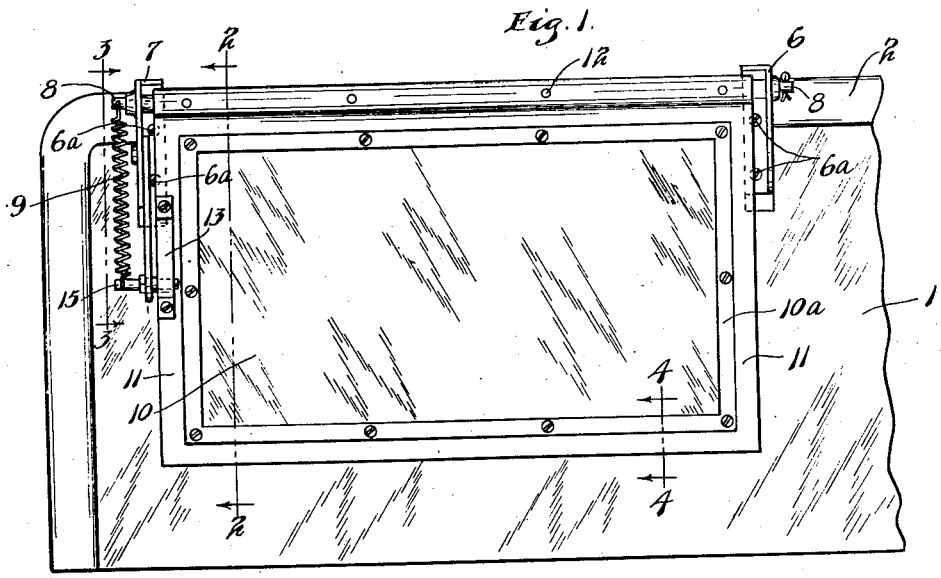
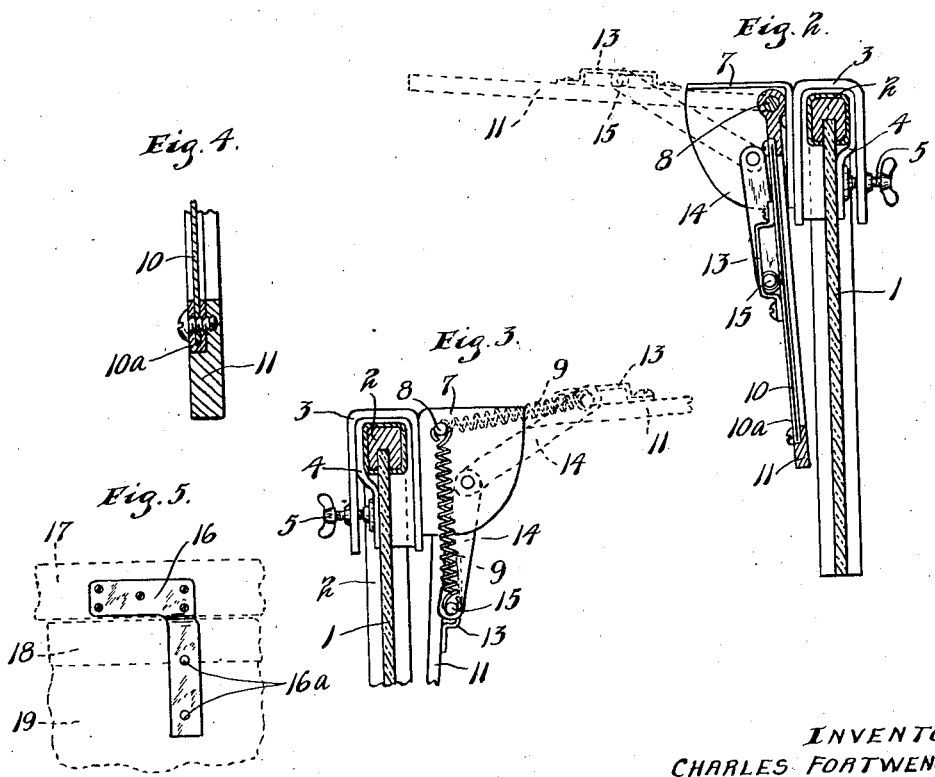
INVENTOR.
CHARLES FORTWENGLER
BY HIS ATTORNEY.

Patented Sept. 1, 1925.

1,552,130

UNITED STATES PATENT OFFICE.

CHARLES FORTWENGLER, OF PARKERS PRAIRIE, MINNESOTA.

NONGLARE WINDSHIELD DEVICE.

Application filed December 8, 1923. Serial No. 679,367.

*To all whom it may concern:*

Be it known that I, CHARLES FORTWEN-GLER, a citizen of the United States, residing at Parkers Prairie, in the county of Otter Tail and State of Minnesota, have invented certain new and useful Improvements in Nonglare Windshield Devices; and I do hereby declare the following to be a full, clear, and exact description of the invention, such as will enable others skilled in the art to which it appertains to make and use the same.

This invention relates to a glare preventing device for a vehicle, and particularly, to such a device adapted to be attached to the wind shield of the ordinary automobile. It is well known to drivers of such vehicles that when driving toward the sun when the same is near the horizon, or in approaching another vehicle at night, a glare is often produced in the driver's eyes so that it is difficult to properly guide the automobile.

It is an object of this invention to provide a simple and efficient glare preventing device comprising a sheet of transparent material, preferably colored, which is adapted to be held at the inside of the wind shield and substantially parallel thereto in one position and to be quickly movable to a position extending substantially at right angles to the wind shield and held in such position.

It is a further object of the invention to provide resilient means for holding the glare preventing device in either of said positions.

It is more specifically an object of the invention to provide such means for holding the glare preventing device in either position, comprising a plate at one end of the device secured to the wind shield and projecting inwardly therefrom substantially at right angles thereto, to which is pivoted a link connected at its other end by a lost motion connection to the sheet forming a glare preventing member, together with a spring secured to one end of said link and adapted to exert stress on lines at different sides of the pivot end of said link when the glare preventing device is in its different respective positions.

These and other objects and advantages of the invention will more fully appear from the following description made in connection with the accompanying drawings in which like reference characters refer to the same parts throughout the different views, and in which, Fig. 1 is a view in front elevation of the device, as seen from the inside of the wind shield;

Fig. 2 is a vertical section taken on the line 2—2 of Fig. 1, as indicated by the arrows;

Fig. 3 is a partial vertical section taken on the line 3—3 of Fig. 1, as indicated by the arrows;

Fig. 4 is a partial vertical section taken on the line 4—4 of Fig. 1, as indicated by the arrows; and Fig. 5 is a view in elevation of a modified form of bracket.

Referring to the drawings, a portion of the vertically extending wind shield of an automobile is shown as 1, having extending about its top and side edges the member 2. Clamps 3 embrace the top portion of member 2 at spaced points and while these clamps may be of any desired shape, in the embodiment of the invention illustrated, the same are shown as formed of U-shaped bars having at the inner sides thereof strips 4 of rubber or other soft or yielding material and said bars are traversed by screws 5 having heads at their inner ends adapted to clamp the strip 4 against the wind shield 1, said screws being provided at their outer ends with wing-shaped handles. Secured to the members 3 by screws 6ª and projecting inwardly of the wind shield substantially at right angles thereto, are plates 6 and 7 having laterally and inwardly projecting flanges thereon. The plates 6 and 7 are substantially triangular in shape and a rod 8 extends between said plates and has its ends journaled in the same adjacent the corners thereof, said rod being prevented from moving in said plates at one end by a split key and at the other end by a spring 9 for a purpose to be later described. A flat piece 10 of transparent material, preferably colored, and of substantially rectangular shape is secured in an opening in the frame 10ª, which frame 10ª is, in turn, secured in a recess formed in a frame 11, which frame has a sleeve at its upper end through which passes the rod 8, said rod being secured to said sleeve by suitable pins or screws 12. The frame members 10, 10ª and 11 thus form substantially a sheet or sheet-like member. The frame 11 carrying part 10 is thus rigidly secured to rod 8. A bracket 13 is secured along one edge of frame 11 and has a raised central portion forming a slot between the same and said frame. A link 14 has one end pivoted adjacent the center of the plate 7 and extends along one end of the frame 11. A pin 15 is secured in the other end of link 14 and extends transversely therethrough, one end of said pin extending into the slot formed by bracket 13. The outer end of the pin 15 has secured thereto the other end of spring 9 to which reference has already been made.

The sheet 10 and frame 11 are adapted to be disposed in two positions. If the same are to be used to prevent objectionable glare from the sun or the lights of approaching vehicles, the same will be disposed in the position shown in full lines in the various figures of the drawing. In this position, the spring 9 is under tension and exerts tension on the line extending at the inner side of the pivoted end of link 14, or, in other words, on a line between said pivoted end and the wind shield 1. If the glare preventing device is not needed, the same can be grasped by the operator and swung upwardly to the dotted line position shown in Figs. 2 and 3. Spring 9, in this movement, crosses the upper or pivoted end of link 14 and exerts tension along a line passing above said pivoted end so that the spring is under tension holding the frame 11 and sheet 10 in its upper position extending substantially at right angles inwardly from the top of the wind shield. During this movement, the pin 15 travels in a slot formed by bracket 13. The inwardly extending flanges on plates 6 and 7 form stops determining the upper position of the frame 11. In its upper position, the glare preventing device will be out of the way and the driver will have a clear vision through the whole of the wind shield.

The inner end of the link 14, as best shown in Fig. 3, is pivoted to the plate 7 at a point inwardly and downwardly from the rod 8 on which the glare shield is pivoted. Since the sliding connection is made in the slot formed by the bracket 13 at the outer end of the link, considerable stress is put upon the link 14 when the shield is swung either above or below either the line passing between the ends of rod 8 and the pivot member at the inner end of the link. Obviously this stress is sufficient and the angle great enough to positively hold the non-glare sheet either in substantially vertical position against the wind shield or in substantially horizontal position adjacent the top of the automobile.

From the above description it is seen that applicant has provided a simple and efficient glare preventing device which is easily and quickly attachable and detachable from the wind shield. The same can quickly be swung to either position and will be firmly held in either position. The glare preventing device covers only a portion of the wind shield and is of a convenient size and one which adapts it to be easily operated. The parts are few and simple and the device can be made and marketed at small cost.

In Fig. 5 is shown a plate bracket 16 adapted for use in closed cars, such as a sedan or coupé. The top portion of said bracket is adapted to be fastened to the top portion of the sedan frame surrounding the wind shield, indicated in dotted lines as 17. The plates 6 and 7 will then be attached by screws similar to 6ª passing through the holes 16ª. The frame 18 and wind shield 19 of the sedan are also indicated in dotted lines. The upper portion of the bracket 16 might also be attached directly to the wind shield by drilling holes through the glass and having headed and nutted bolts pass therethrough.

It will, of course, be understood that various changes may be made in the form, details and arrangement and proportions of the parts without departing from the scope of applicant's invention, which, generally stated, consists in a device capable of carrying out the objects above stated, such as shown and described and set forth in the appended claims.

What is claimed is:

1. A non-glare attachment for a wind shield of an automobile comprising horizontally alined spaced brackets secured to the wind shield and extending inwardly thereof, a non-glare sheet pivoted to and between said brackets along one of its edges, a member secured at one side of said sheet having a longitudinal slot therein, a swinging link having one end pivoted to one of said brackets and the other end guided by said slot, and an elastic element interposed between the outer end of said link and said bracket adapted to exert stress on either side of said link when said sheet is swung, to hold said sheet either in upward horizontal or downward vertical position.

2. A non-glare attachment for a wind shield of an automobile comprising horizontally alined spaced brackets secured to the wind shield and extending inwardly thereof, a non-glare sheet disposed between said bracket and having pivot members at its top portion journaled therein, a slot forming member secured at one side of said sheet, a swinging link having its inner end pivoted to one of said brackets rearwardly and downwardly of said adjacent pivot member for said non-glare sheet, and having its outer end guided by the slot formed by said member, and an elastic element interposed between the outer end of said link and the end of the adjacent pivot member for said non-glare sheet adapted to exert stress when said sheet is swung at either side of said link to hold said sheet either in upward horizontal or downward vertical position.

3. A non-glare attachment for a wind shield of an automobile comprising horizontally alined spaced brackets secured to the wind shield and extending inwardly thereof, a non-glare sheet pivoted to and between said brackets along one of its edges, a link having one of its ends pivotally connected to one of said brackets and having a sliding connection at its other end with said glare sheet, and an elastic element interposed between the end of said link and said bracket, whereby a stress will be exerted when said glare sheet is swung either above or below said link to hold said sheet either in upward horizontal or downward vertical position.

In testimony whereof I affix my signature.

CHARLES FORTWENGLER.